No. 783,392. Patented February 21, 1905.

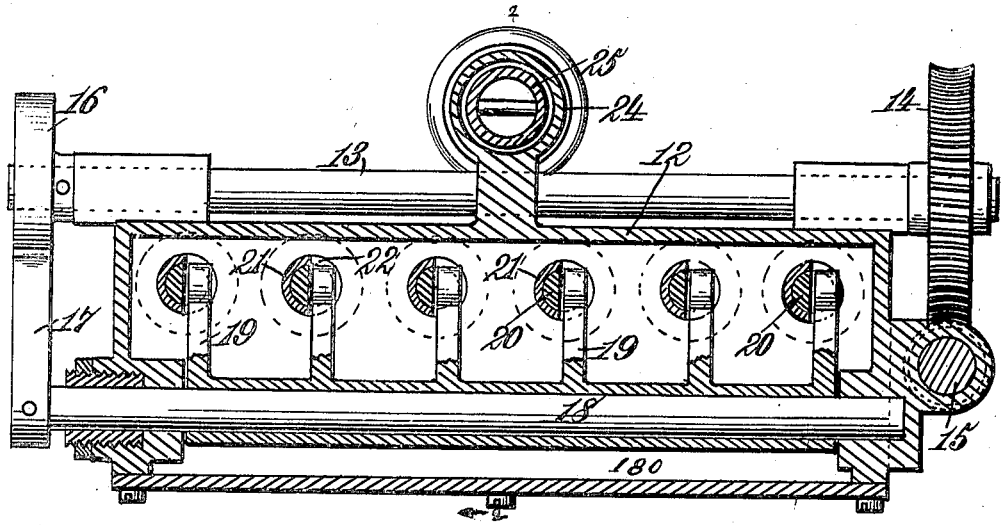

UNITED STATES PATENT OFFICE.

THOMAS LEGGETT STURTEVANT, OF QUINCY, AND THOMAS JOSEPH STURTEVANT, OF WELLESLEY, MASSACHUSETTS.

OIL-PUMP.

SPECIFICATION forming part of Letters Patent No. 783,392, dated February 21, 1905.

Application filed August 22, 1904. Serial No. 221,770.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented certain new and useful Improvements in Oil-Pumps, of which the following is a specification, reference being had therein to the accompanying drawings.

The present invention relates to power-oilers, and is especially designed for use in connection with automobiles, although it will be understood that the oiler which forms the subject of the present case is not restricted to any particular type of machine, but may be used wherever it is desirable to have an efficient power-oiling device to force the lubricant to the bearings or other parts which must be oiled.

The invention which will be hereinafter described is in the nature of an improvement on the power-oiler or multiple oil-pump shown and described in our Patent No. 762,103, dated June 7, 1904, and in some ways resembles the construction therein shown.

The improved oiling device has for its object to provide, in connection with the multiple power-operated rams which deliver the oil from the supply to the parts to be lubricated, an auxiliary oil-forcing means for manually flooding said multiple power oil-rams and their delivery-tubes, so that in event of the machine standing idle for such a length of time as to permit leakage of the oil from any of the rams and delivery-passages and a resulting dryness thereof these dry oil-rams and passages may be quickly and conveniently flooded with oil and their action supplemented, so that they will begin to deliver the lubricant to the bearings and other parts as soon as the machine is started, and will not run in dry condition for a few strokes without delivering any lubricant to the parts to be oiled, as is not infrequently the case where no provision is made for preliminary flooding or filling of the power-pump. Furthermore, the power-operated rams and the auxiliary oil-forcing means are so arranged relative to each other and so connected with the oil-supply and oil-delivery-pipes that they may be operated simultaneously, so that one supplements the action of the other and secures a maximum delivery of the oil to the parts to be lubricated, or they may be operated independently of each other.

Another object of the invention is to provide for an adjustment of the oil-rams, so that while operated from a common actuating-shaft each ram of the series may be adjusted as to its flow so as to increase or decrease the amount of oil fed through its delivery-pipe in accordance with the needs of the particular part of the machine which is fed, for it is obvious that where one ram is oiling a bearing of comparatively small size and another ram is oiling a large cylinder the difference in the amount of oil necessary to properly lubricate these two elements is considerable.

In the drawings herewith we have illustrated one embodiment of our invention.

In said drawings, Figure 1 is a view, partially in section, of the battery of oil rams or pumps and their operating mechanism. Fig. 2 is a transverse sectional view of the power-oiler on line 2 2 of Fig. 1 looking in the direction of the arrow and showing the relation of the power-pumps and the manually-operated flooding-pump. Fig. 3 is a detail view of the operating cam or disk for the ram-actuating shaft; and Figs. 4 and 5 are detail views of two ram-cylinders, to illustrate the adjustable features of the pump or ram.

Referring to the drawings by numerals, like numbers indicating like parts in the several views, 12 indicates the pump-reservoir, in which is mounted in suitable bearings the power-shaft 13 for operating the oil-rams, said power-shaft being driven in any suitable manner, this driving means in the present case being shown as a worm-wheel 14, operated by a worm-shaft 15, driven from any suitable source of power. Mounted on said power-shaft 13 is a cam or mutilated disk 16, which engages a tappet-arm 17 on a pump or ram operating shaft 18, which shaft 18 is mounted in suitable bearings in a ram-chamber 180 in the lower part of the pump-casing 12. The said ram-operating shaft 18 is provided with a fixed sleeve carrying a series of levers 19, which engage at their upper ends the slotted or notched ram-pistons 20, as clearly shown in Figs. 2, 4, and 5, said ram-pistons being mounted in pump-cylinders 21, carried by the frame or casing 12, and all placed within the said ram-chamber 180. These cylinders 21 are cut away at one side so as to form openings 22 to permit play of the piston-actuating arms 19 and also to admit oil to the cylinders from the main source of oil-supply, which oil-supply delivers, through a passage 23, to the pump-reservoir 12, within which the power pumps or rams and their operative parts are located.

In the upper part of the frame or casing 12 is a cylinder 24, within which is mounted for reciprocation a manually-operated piston 25, the said cylinder 24 being in communication with the main oil-passage 23, so that by operating the said piston 25 the hand-pump will draw oil from the main supply and force it through the passage 26 into the pump chamber or casing 12, flooding the power-rams and delivery-passages and placing them in condition to start the forcing of oil to the parts to be oiled as soon as the power-shaft and the power oiling devices are set in operation. A suitable check-valve 27 is provided at the outlet of the main oil-passage 23 to prevent backflow of the oil during operation of the pumps. It will thus be seen that the operator can guard against the objectionable dryness of the battery of oil-rams and the outlet-passages incident to an idle condition of the machine for any length of time by simply operating the hand-pump a few times prior to starting his power oil-rams, such hand-pump flooding the power-rams, supplementing their feeding action, and placing them in condition for immediately delivering the proper lubricant to the parts as soon as the machine is started.

It will be apparent also that while the oil-rams are working if it should be desired to supplement their action by operating the manually-controlled oil-forcing means or pump this may be readily done by the operator and an increased or maximum flow of oil to the parts to be lubricated secured.

It will be seen that the auxiliary pump is connected with the supply-pipe 23 at a point outside of the point of delivery of said supply pipe or passage to the ram-chamber 180 and, as shown in the present construction, between said ram-chamber 180 and the check-valve 27, which controls the said supply pipe or passage 23, so that an oil-supply pipe common to both of the pump instrumentalities is provided. Furthermore, it is apparent that when the auxiliary pump is operated it will draw oil through a common supply-pipe 23, force it into said ram-chamber 180, flood the rams therein, and deliver the oil through the ram-outlet passages leading from the ram-cylinders, so that the same delivery-pipes are common to the auxiliary pump and the power-operated rams.

The pistons 20 of the oil-rams are preferably of the spring-actuated type shown in our patent above referred to in order to provide for quick and uniform oil-forcing movements of the piston regardless of the speed of the piston-retracting shaft 18, the construction in the present instance differing from the patent noted in that each piston 20 is backed by an actuating-spring 28, placed within the ram-cylinder 21 behind the piston, so that each ram is complete so far as its oil-forcing powers are concerned, and derangement of the forcing-spring of one ram does not affect any of the others. Each of said cylinders 21 is provided at its forward end with a delivery-nipple 29, and adjustably seated at the forward end of said cylinder 21, preferably by a screw-thread connection, is a check-valve casing 30, carrying the usual spring-check valve 31. The said valve-casing 30 is adjustable by means of its screw-threaded connection within the ram-cylinder, and its inner end forms a stop or abutment against which the spring-actuated piston 20 strikes at the end of its forward or oil-forcing movement. It will be apparent that by adjusting the said stop or abutment the length of stroke of the oil-forcing piston 20 may be varied, as clearly shown in the comparative illustration in Figs. 4 and 5, so that the volume of oil forced out through the delivery-nipples 29 of the respective rams may be varied in accordance with the needs of the parts to be lubricated. The said valve-casing is preferably held in adjusted position by means of a lock-nut 32, and the ram-cylinder 21 is capped by suitable end caps, as shown, the forward end cap having a transparent sight-disk, through which the feed of the ram may be observed.

From the foregoing it will be seen that as the power-shaft 13 is operated through the driving connections described the cam or mutilated disk 16 will rock the shaft 18 in its bearings and through the levers 19 retract the ram-pistons 20, so as to permit the cylinders 21 to fill with oil from the supply, and as soon as the tappet 17 drops from the cam point or disk mutilation in the disk 16 the springs 28 of the oil-rams, which have been compressed during the retraction of the pistons, will give a quick oil-forcing movement to the said pistons 20, carrying them forward until they strike their respective stops or abutments on the valve-casings 30.

It will be understood that the structure shown and described is merely illustrative, and as the construction is capable of considerable variation within the range of mechanical skill without departing from our invention we do not wish to be understood as limiting ourselves to anything shown and described except so far as we are limited by the terms of the appended claims.

What we claim is—

1. In a power-oiler and in combination, a ram-chamber, a power-operated oil-forcing ram in said chamber, a supply-pipe delivering oil to said chamber from a suitable source, a delivery-pipe through which said ram forces oil to the parts to be lubricated, and an independent auxiliary oil-forcing pump connected with said supply-pipe outside its point of delivery to said chamber, whereby operation of said auxiliary pump will draw oil through said supply-pipe, force it into said chamber, flood said ram, and deliver it through said ram delivery-pipe to the parts to be lubricated.

2. In a power-oiler and in combination, a ram-chamber, a series of power-operated oil-forcing rams in said chamber, a supply-pipe delivering oil to said chamber from a suitable source, a series of delivery-pipes through which said rams force oil to the parts to be lubricated, and an independent auxiliary oil-forcing pump connected with said supply-pipe outside its point of delivery to said chamber; whereby operation of said auxiliary pump will draw oil through said supply-pipe, force it into said chamber, flood said rams, and deliver it through said ram delivery-pipes to the parts to be lubricated.

3. In a power-oiler and in combination, a ram-chamber, a series of power-operated oil-forcing rams in said chamber, a supply-pipe delivering oil to said chamber, a check-valve in said pipe, a manually-operated auxiliary pump connected with said supply-pipe between its point of delivery to the ram-chamber and said check-valve, whereby operation of said pump will draw oil through said supply-pipe, force it into said chamber, and flood said rams, and delivery-pipes through which both rams and pump force oil from said chamber to the parts to be lubricated.

4. In a power-oiler, the combination with a ram-cylinder, of an oil-ram in said cylinder, a spring to give a quick oil-forcing stroke to said ram, means for retracting said ram to make its suction-stroke, and adjustable means for limiting the movement of the ram and varying the amount of oil delivered by it.

5. In a power-oiler, the combination with a ram-cylinder, of an oil-forcing ram in said cylinder, and an adjustable stop to limit the movement of the ram and vary the amount of oil delivered by it.

6. In a power-oiler, the combination with a series of ram-cylinders, of ram-pistons in said cylinders, springs for giving a quick oil-forcing stroke to said pistons, power-operated means to retract said rams to make their suction-stroke, and outlet-valve casings in said cylinders; said valve-casings being adjustable to afford limiting-stops for the ram-pistons in making their oil-forcing strokes and so vary the amount of oil delivered by each ram.

In testimony whereof we affix our signatures in presence of two witnesses.

THOMAS LEGGETT STURTEVANT.
THOMAS JOSEPH STURTEVANT.

Witnesses:
L. H. STURTEVANT,
W. H. ELLIS.